United States Patent [19]
Benzschawel et al.

[11] Patent Number: 5,388,217
[45] Date of Patent: Feb. 7, 1995

[54] DISTRIBUTING SYSTEM FOR MULTI-PROCESSOR INPUT AND OUTPUT USING CHANNEL ADAPTERS

[75] Inventors: Gary E. Benzschawel; Lonnie R. Heidtke; Steven S. Chen, all of Chippewa Falls; Fredrich J. Simmons; George A. Spix, both of Eau Claire, all of Wis.

[73] Assignee: Cray Research, Inc., Eagan, Minn.

[21] Appl. No.: 807,082

[22] Filed: Dec. 13, 1991
(Under 37 CFR 1.47)

[51] Int. Cl.⁶ ............................................. G06F 15/16
[52] U.S. Cl. ...................................... 395/275; 395/325
[58] Field of Search ............. 395/275, 325, 200, 800, 395/425, 400; 364/225.5

[56] References Cited

U.S. PATENT DOCUMENTS

| | | | |
|---|---|---|---|
| 3,400,372 | 9/1968 | Beausoleil et al. | 340/172.5 |
| 3,432,813 | 3/1969 | Annunziata et al. | 340/172.5 |
| 3,618,045 | 11/1971 | Campbell et al. | |
| 3,725,864 | 4/1973 | Clark et al. | 395/275 |
| 3,772,656 | 11/1973 | Serracchioli et al. | |
| 3,889,237 | 6/1975 | Alferness et al. | |
| 3,996,564 | 12/1976 | Kerrigan et al. | |
| 4,000,487 | 12/1976 | Patterson et al. | 395/275 |
| 4,124,889 | 11/1978 | Kaufman et al. | |
| 4,258,418 | 3/1981 | Heath . | |
| 4,271,479 | 6/1981 | Cheselka et al. | |
| 4,276,594 | 6/1981 | Morley | 395/800 |
| 4,300,193 | 11/1981 | Bradley et al. | |
| 4,313,160 | 1/1982 | Kaufman et al. | 395/275 |
| 4,403,282 | 9/1983 | Holberger et al. | |
| 4,458,316 | 7/1984 | Fry et al. | |
| 4,460,959 | 7/1984 | Lemay et al. | |
| 4,543,627 | 9/1985 | Schwab . | |
| 4,771,378 | 9/1988 | Halford | 395/325 |
| 4,807,121 | 2/1989 | Halford | 395/275 |
| 4,821,170 | 4/1989 | Bernick et al. | 395/275 |
| 5,168,547 | 12/1992 | Miller et al. | 395/325 |

FOREIGN PATENT DOCUMENTS 2020456  11/1979  United Kingdom .

Primary Examiner—Dale M. Shaw
Assistant Examiner—Sang Hui Kim
Attorney, Agent, or Firm—Schwegman, Lundberg & Woessner

[57] ABSTRACT

Four clusters of 16 CPU's each are each associated with a solid state memory and a main memory. Each CPU is uniquely associated with a channel arbitrator which interconnects the associated CPU to serial ports. Each channel arbitrator is associated with a set of 16 serial channels. Each serial channel is in turn interconnected to a channel adapter which includes software and firmware adapted for interacting with a specific peripheral device. Each channel adapter also has software and firmware which is device-independent for data transfer with the channel arbitrator. The channel arbitrator includes a memory port for accessing main memory through the CPU, a port for accepting service requests and providing interrupts to the CPU's, direct memory access control logic, arbitration control logic, serial ports associated with the channel adapters, and a parallel port is associated with solid state memory. Direct memory access requests are queued at the channel while higher-priority serial transfer requests are serviced. Direct memory access is provide in 64-word blocks designated by perimeter packets indicating a number of blocks, starting address in main memory, starting address in solid state memory, and an indication of the direction of transfer.

16 Claims, 11 Drawing Sheets

DISTRIBUTING SYSTEM FOR MULTI-PROCESSOR INPUT AND OUTPUT USING CHANNEL ADAPTERS

FIELD OF THE INVENTION

The present invention relates to the field of high-speed data processors, and more particularly to multi-processor input and output systems.

BACKGROUND OF THE INVENTION

The present invention relates to the hardware and software architecture for input and output sub-systems as part of a multi-processor computer system including a number of central processing units (CPUs) and memory. Greater efficiency and speed is available through the use of a large numbers of CPUs capable of performing independent tasks of different jobs, or related jobs or related tasks of-a single job either simultaneously or with greater speed and efficiency than is possible with a smaller number of CPUs. The performance of such tasks will typically involve steps including accessing data and instructions from memory as well as accessing peripheral devices such as hard disk drives.

To efficiently complete tasks of different CPUs simultaneously, protocols must be developed and implemented to switch interconnections among the CPUs, memory, and peripheral devices. Such switching systems may be quite complex.

Moreover, with the use of a large number of CPUs and peripherals, the input and output system is potentially a speed-limiting aspect of the system. The input/output system must have sufficient uniformity and treatment of the various CPUs, the peripherals, and memory so that efficient interaction occurs, yet have sufficient customization for particular peripherals to communicate with such peripherals in the most efficient manner. As a result, it is desirable that an input/output system have sufficient uniformity to increase the efficiency of the interaction of the system subparts, yet have the circuitry necessary to vary the manner in which input and output is performed with peripherals.

SUMMARY OF THE INVENTION

The present invention provides a parallel and distributed input and output system for a multi-processor data processing system. The system includes a set of central processing unit clusters, each of the clusters having a subset of CPUs which include a number of serial channels. Each of the CPUs is associated with an input/output channel arbitrator processor means which interconnects the associated CPU to the serial ports. The system also includes solid state memory associated with each CPU cluster and main memory associated with each CPU cluster. Each serial channel from the CPUs is associated with a channel adapter processor means which interconnects the serial channels to peripherals. The channel adapter processor means is comprised of device-independent circuitry which is the same for each channel adapter for interfacing with the serial channels of the CPUs. Each channel adapter processor means also has circuitry which is dependent on and customized for the peripheral attached to the channel adapter processor means for interfacing with the peripheral. Typically, the channel adapter processor means and serial channels of the channel arbitrators will be interconnected with high-speed data transfer means such as optical fibers. Similar high-speed data transfer means will be employed between the CPU channel arbitrators, solid state memory, and main memory. Implementation of this system includes storage of parameter packets in memory which are accessible by the channel adapter when the channel adapter is ready to perform the instructions associated with the parameter package. These and other aspects of the input/output system of the present invention are discussed and described in more detail below with respect to the specification and drawings.

DETAILED DESCRIPTION OF THE PREFERRED EMBODIMENTS

In the following detailed description of the preferred embodiment, reference is made to the accompanying drawings which form a part hereof, and in which is shown by way of illustration a specific embodiments in which the invention may be practiced. It is to be understood that other embodiments may be utilized and electrical, structural and logical changes may be made without departing from the scope of the present invention.

Figure 1:
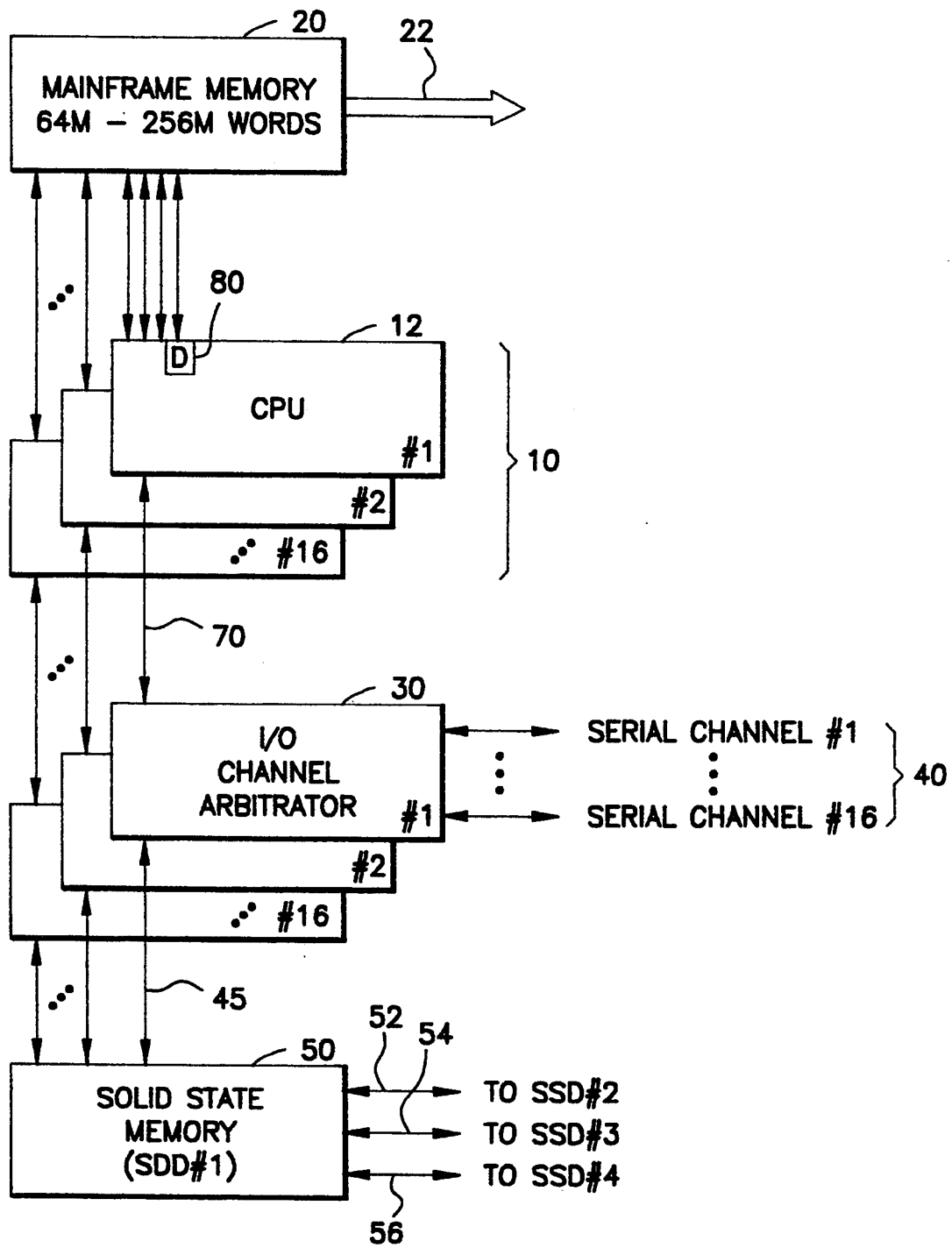
FIG. 1 is a block diagram of the overall organization of the multi-processor system according to the present invention.

In the preferred embodiment, the input/output system as described herein is used in conjunction with a super-computer system that consists of four clusters of CPUs. As shown in FIG. 1, a cluster 10 includes 16 CPUs identical to CPU 12 in FIG. 1. The CPU cluster 10 shares common mainframe or main memory 20. Main memory 20 is interconnected by a port 22 to a similar main memory in each of the other four clusters of CPUs (not shown). Thus, contiguous address space is provided across all four CPU clusters.

As shown in FIG. 1, each CPU, such as CPU 12, has a channel arbitrator such as arbitrator 30 associated with it. Channel arbitrator 30 provides a signal datapath and associated arbitration control for a set of 16 serial channels such as set 40 associated with channel arbitrator 30. Thus, one CPU cluster having 16 CPUs and 16 channel arbitrators has a total of 256 serial channels.

The optical fibers comprising a serial channel will now be described. In the preferred embodiment, a single serial channel such as channel #1 from set 40 includes four data optical fibers and two control optical fibers. Two of the four data fibers are transmitting fibers and two are receiving fibers. A data packet consists of 32 serial bits preceded by one sync bit. Typically 64—64 bit words are transmitted at a time, equalling one block of data. Each word is read out of a buffer, divided into two 32 bit packets, and the two packets are simultaneously sent over the transmitting data optical fibers. Once a buffer is emptied, the "fire code" error and correction information is put into the data packets and sent over the optical fiber lines. The two control optical fibers include a transmitting and a receiving fiber. Those skilled in the art will readily recognize that dedicated electrical connections may be substituted for the fiber optic connections described here without departing from the spirit of the scope of the present invention.

Each channel arbitrator such as arbitrator 30 also has a high speed parallel channel such as channel 45 for interconnection to solid state memory device (SSD) 50. One solid state memory will be associated with each 16 CPU cluster. Each solid state memory is interconnected by ports 52, 54, 56 to the other solid state memories corresponding to the other CPU clusters in the system. A solid state memory storage device suitable for use with the present invention is described in U.S. Pat. No. 4,630,230 which is hereby incorporated by reference.

Each CPU such as CPU 12 is interconnected to its dedicated channel arbitrator such as arbitrator 30 via an interconnection such as interconnection 70. The channel arbitrator provides a path from the set of serial channels 40 through port D 80 of CPU 12 to main memory 20.

Each channel arbitrator such as arbitrator 30 includes dedicated hardware which controls direct memory access (DMA) transfer between solid state memory 50 and main memory 20. All transfers from solid state memory occur in 64 word blocks. The interconnections between the arbitrator, CPU port D, and main frame memory are shown in further detail in FIG. 2.

Figure 2:
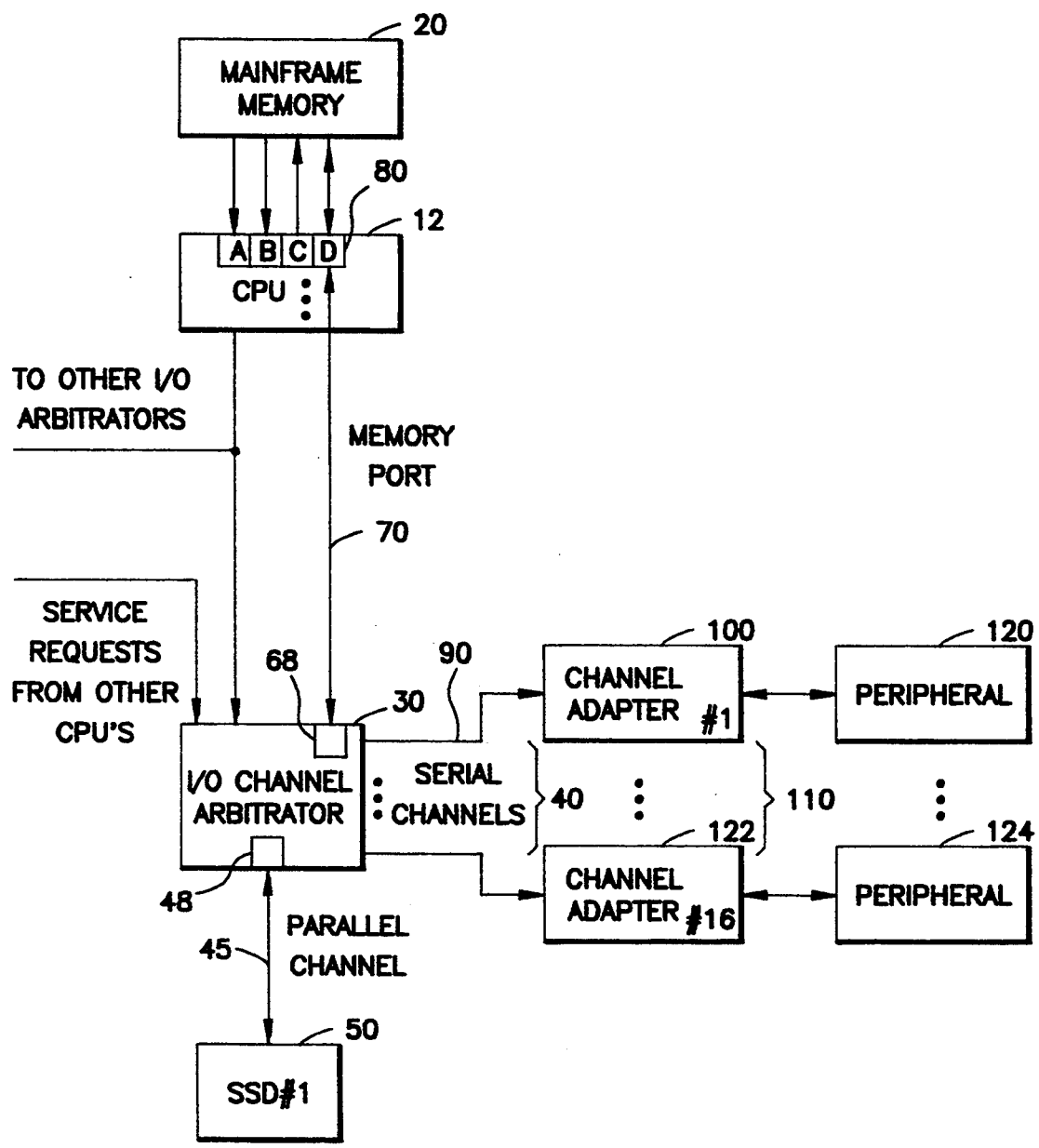
FIG. 2 is a block diagram of a representative portion of the multi-processor system including the interconnections between peripherals, solid state memory, mainframe (or main) memory, and a CPU.

FIG. 2 shows connections to a representative channel arbitrator 30. Each of the serial channels which are part of the set of serial channels 40 interconnected with arbitrator 30 has associated therewith a channel adapter. For example, serial channel 90 has associated therewith channel adapter 100 which is part of channel adapter set 110 associated with arbitrator 30. A channel adapter interconnects with the peripheral. In the case of channel adapter 100, it is interconnected and associated with peripheral 120. Channel adapter 122 is associated with peripheral 124. Other channel adapters and peripherals are not shown but are similarly connected.

The use of a dedicated input/output arbitrator for each CPU allows the use of many parallel paths among peripherals, main-frame memory, solid state memory, and CPUs. Each arbitrator has one high speed parallel port such as port 68 of arbitrator 30 which is capable of transferring data at the maximum rate of the memory port to the CPU memory port D 80. Each channel arbitrator also has a high-speed parallel port such as port 48 for arbitrator 30 which interconnects with solid state memory 50 for data transfer at the memory port's maximum rate. These ports are in addition to the 16 ports associated with the set of 16 serial channels such as set 40 for channel arbitrator 30. In the preferred embodiment, these 16 serial ports have a specified minimum sustained data transfer rate such as a rate of 1 gigabit per second. The channel arbitrator also interconnects with other arbitrators and has a port for receiving service requests from other CPU's in the CPU cluster.

Figure 3:
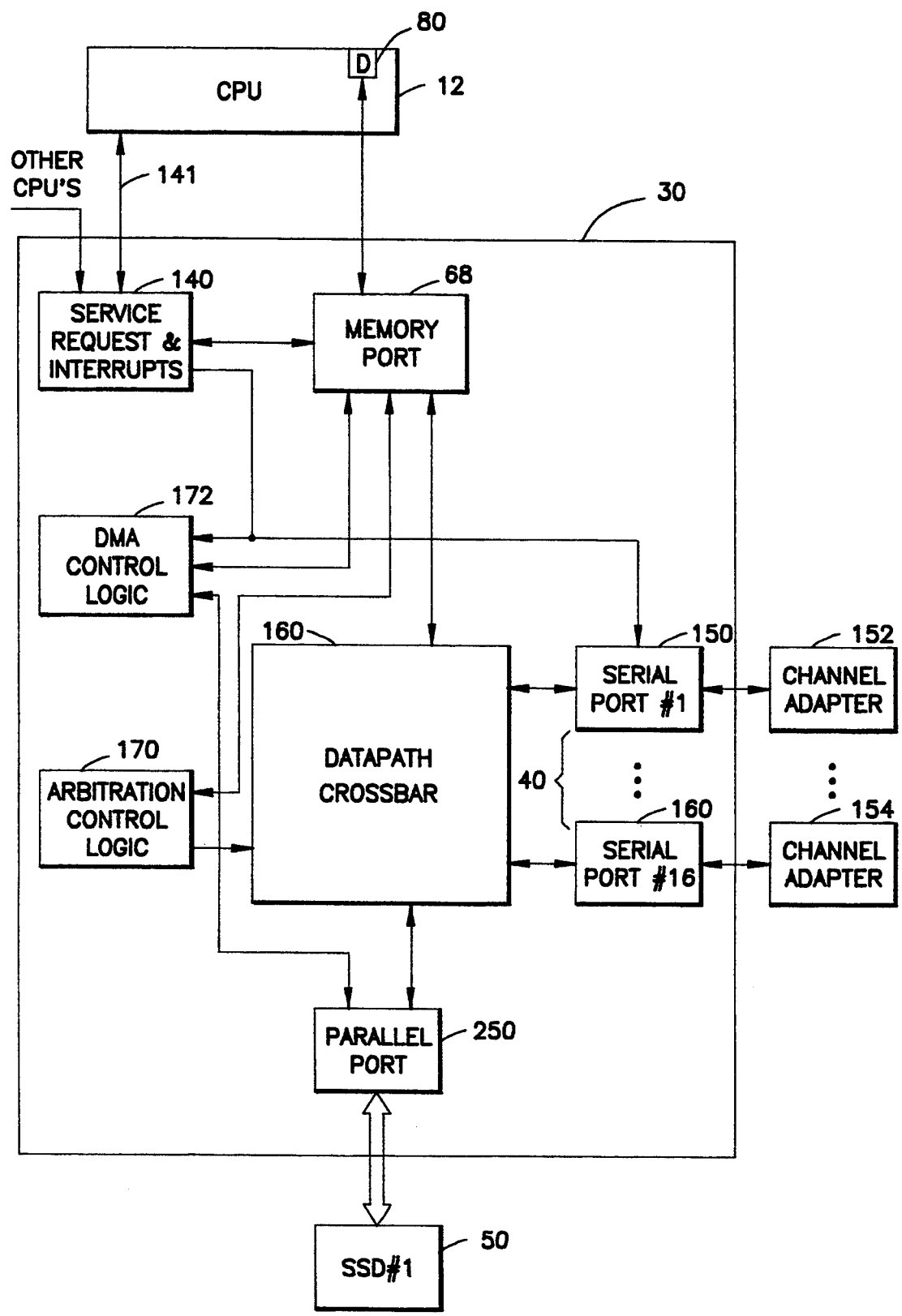
FIG. 3 is a block diagram of the input/output channel arbitrator as interconnected with a dedicated CPU, solid state memory, other CPUs, and channel adapters.

The channel arbitrator 30 is shown in further detail in FIG. 3. The arbitrator provides the datapath switching network and associated control to link data among the CPU 12, peripheral devices (connected through channel adapters), and the solid state memory 50. A CPU initiates an input or output service request. Each of the 16 CPUs in a cluster has direct access to each of the 16 channel arbitrators associated with the cluster through service requests port 140. The CPU to which a particular channel arbitrator is dedicated not only has such direct access to service requests, but also is directly connected through D memory port to memory port 68 of the dedicated channel arbitrator. Moreover, the channel arbitrator may raise an interrupt flag in the CPU to which it is dedicated but not to the other CPUs over line 141.

Memory port 68 provides a datapath and associated control between the arbitrator 30 and the D port 80 of CPU 12. D port 80 provides a path to the main memory associated with CPU 12. No error detection is performed at this memory port. Instead, the port transfers data and error correction bits to the error correction circuitry at the circuit ports and at the CPU. The CPU also provides conflict resolution for the memory port. The CPU provides for a queue which allows memory references to be stored consecutively and to be processed at the maximum band-width that can be sustained by the D port 80 of the CPU.

The channel arbitrator also includes arbitration control logic circuit 170 connected to control a datapath crossbar connection switching network 160. The bandwidth of the datapath crossbar 160 is such that all serial channels can be serviced at their maximum transfer rates.

The data crossbar 160 of the channel arbitrator provides the primary datapath connections among the 16 serial ports 40, the solid state memory parallel port 250, and the CPU memory port 68. The width of the datapath and the crossbar is 72 bits, including 64 data bits and 8 error correction bits. The crossbar transfers one parallel word per clock period.

The channel arbitrator includes inputs from each of the CPUs within a CPU cluster for service requests. A simple scanner circuit in the arbitrator will service the service requests from the CPUs as they accumulate in assembly registers.

The service request/interrupt port 140 of arbitrator 30 searches for one bit of an input/output transfer parameter packet to determine the type of interrupt to be used upon completion of the transfer. If a hard interrupt is flagged, the interrupt is directed to the parent CPU for the arbitrator with an I/O interrupt flag after the initiating parameter packet is updated. If a soft interrupt is flagged, the initiating parameter packet will be updated to indicate that the transfer is completed, and no I/O interrupt flag for the parent CPU will be set.

CPU service requests are received at service request port 140 of channel arbitrator 30. The requests are in the form of either a DMA transfer request or a serial channel transfer request. DMA transfers are requests to read or write which include datapaths between a main memory and the solid state memory. The control logic hardware 172 for DMA transfers resides in arbitrator 30.

Serial channel transfers involve data transfer between main memory or solid state memory, at one end, and any serial port which is part of serial port set 40 of channel arbitrator 30, at the other end. No other transfers, such as between one serial port and another serial port, may be accomplished with a serial channel transfer request. All serial channels have a higher priority than DMA transfers. The set of 16 serial ports 40 are ranked in priority. For example, serial port #1 150 may have the highest priority, with priority descending as the number of the port increases such that serial port #16 160 has the lowest priority for channel arbitrator 30. One DMA transfer and up to 16 serial channel transfers may proceed at the same time.

The data transfers include the transfer of data through datapath crossbar 160 of channel arbitrator 30. The arbitration control logic circuitry 170 is interconnected with datapath crossbar 160 to control requests for use of the crossbar. The serial channel request, which may vary between 1 and 64 words, reserves the crossbar 160 until the transfer is completed. Up to four DMA requests may be pending at the same time, and all such pending requests will be completed even when the DMA transfer is preempted by a serial channel transfer request. Multiple DMA requests are allowed because the transfers will occur at the memory port's maximum transfer rate, and because time is used to access such memory. FIG. 3 also shows the parallel port 250 for solid state memory 50, interconnected with crossbar 160 and controlled by DMA control logic 172.

Figure 4:
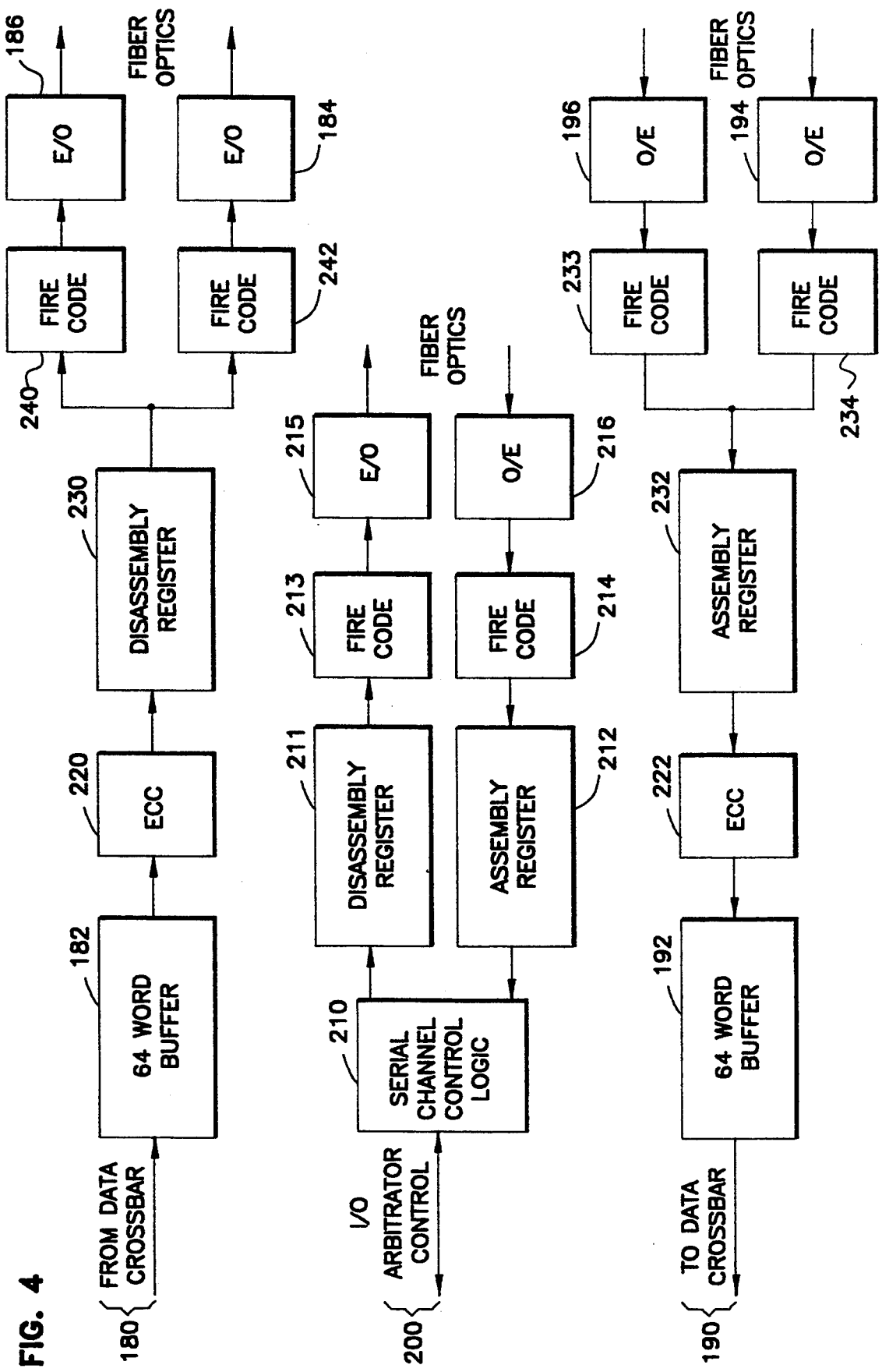
FIG. 4 is a block diagram showing the interconnections between fiber optic connections to the serial channels, data crossbars, and arbitrator controls.

FIG. 4 shows a representative serial channel port such as serial port 150 of channel adapter 30 in FIG. 3. The serial channel port includes a first channel 180 for outputting the datapath crossbar to the fiber optic transmission path leading to the channel adapter and associated peripheral. Each serial channel port also includes a second channel 190 for transferring data from a channel adapter over fiber optic lines to the datapath crossbar associated with the channel arbitrator. Each serial channel port also has a control system 200 shared by the output channel 180 and input channel 190. The control signalling for control system 200 may be supplied to channels 180 and 190 simultaneously. Each channel 180 and 190 includes 64-word buffers 182 and 192, respectively, for buffering the data being transferred. The first channel 180 also includes a pair of electrical/optical converters 184, 186 and the second channel 190 includes a pair of optical/electrical converters 194, 196 for converting between an optical signal received over fiber optic lines and an electrical signal readable by the channel arbitrator.

Outgoing data is transferred in parallel form from the data crossbar to 64-word buffer 182. Each 72-bit data word includes 8 bits of error control information which is transferred, with the data, from buffer 182 to error control circuitry 220 for error detection and correction of the data transferred. The corrected data is transferred from the error control circuit 220 to the disassembly register 230 for conversion from parallel to serial form. Two sets of serial data passes through "fire code" encoding circuits 240, 242, and then is converted from electrical to optical form at converters 184, 186 for transfer of the data on fiber optic lines. Incoming data goes through a reverse process as shown in FIG. 4 at channel 190.

A serial channel transfer request is initiated by a channel adapter. The request is interpreted by serial channel control logic 210, which in turn makes a request to the arbitration control logic 170 of the arbitrator.

The common control logic channel 200 provides protocol for communication with remote channel adapters at the opposite end of the fiber optic links, to download service requests received by the channel arbitrator, and to interface with the arbitration control logic 170.

Figure 5:
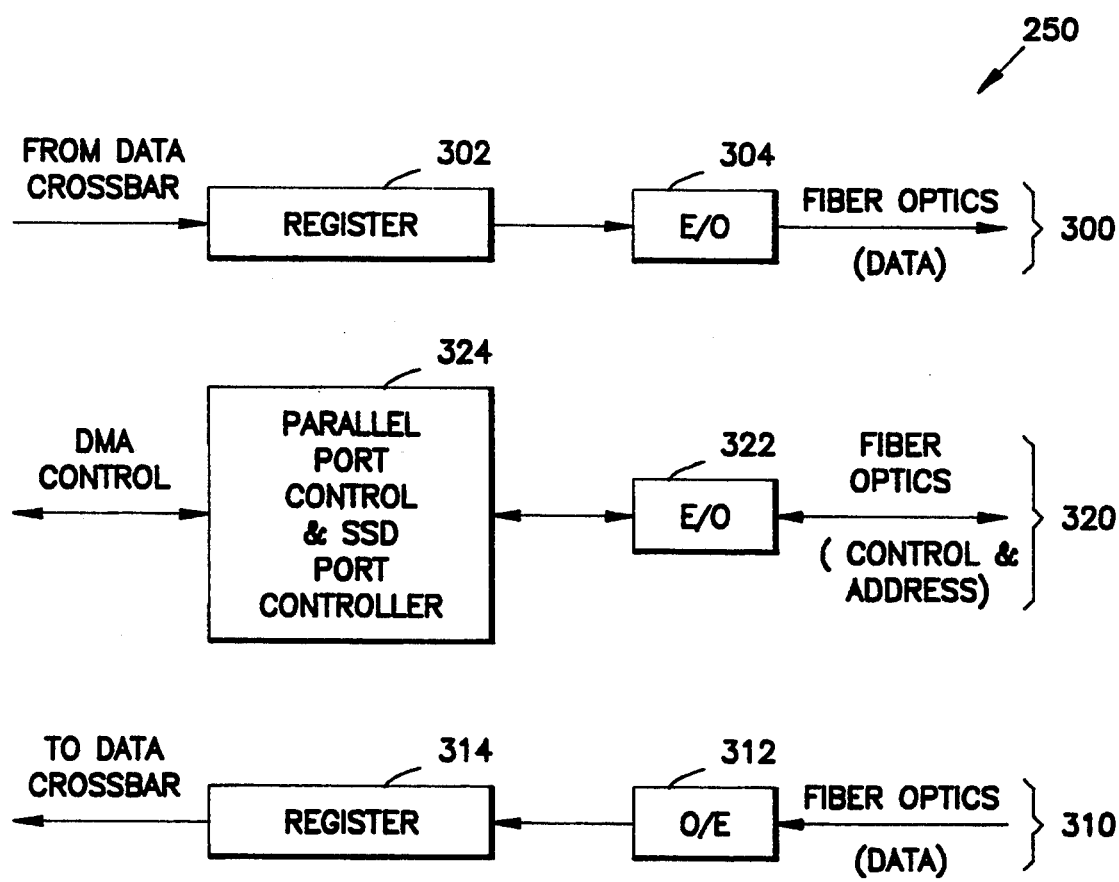
FIG. 5 is a block diagram showing the interconnections between memory ports, data crossbars, and memory port controls.

The parallel port 250 of arbitrator 30 which interfaces with the solid state memory 50 is shown in greater detail in FIG. 5. The port has output lines 300, input lines 310, and an address and control lines 320. Both DMA requests and serial channel requests are handled by parallel port 250. Data is output from data crossbar 160 through register 302. The parallel data is converted from electrical to optical form at converter 304 to put the data in a form suitable for fiber optic transmission to solid state memory 50. Register 302 provides buffering necessary for data alignment. As shown at elements 312 and 314, inputting data from the solid state memory to the channel arbitrator is accomplished in a reverse process. Parallel channel port 250 also includes parallel port control and solid state memory port control 324. The controller 324 is interconnected with DMA control logic 172 and, through electrical/optical converter 322, to solid state memory 50. No error correction hardware is provided at the parallel channel port 250, since error correction is performed at the solid state memory, main memory, and serial ports. However, 8 error correction bits are transferred with each word of data through parallel port 250 for processing at these other locations.

Figure 6:
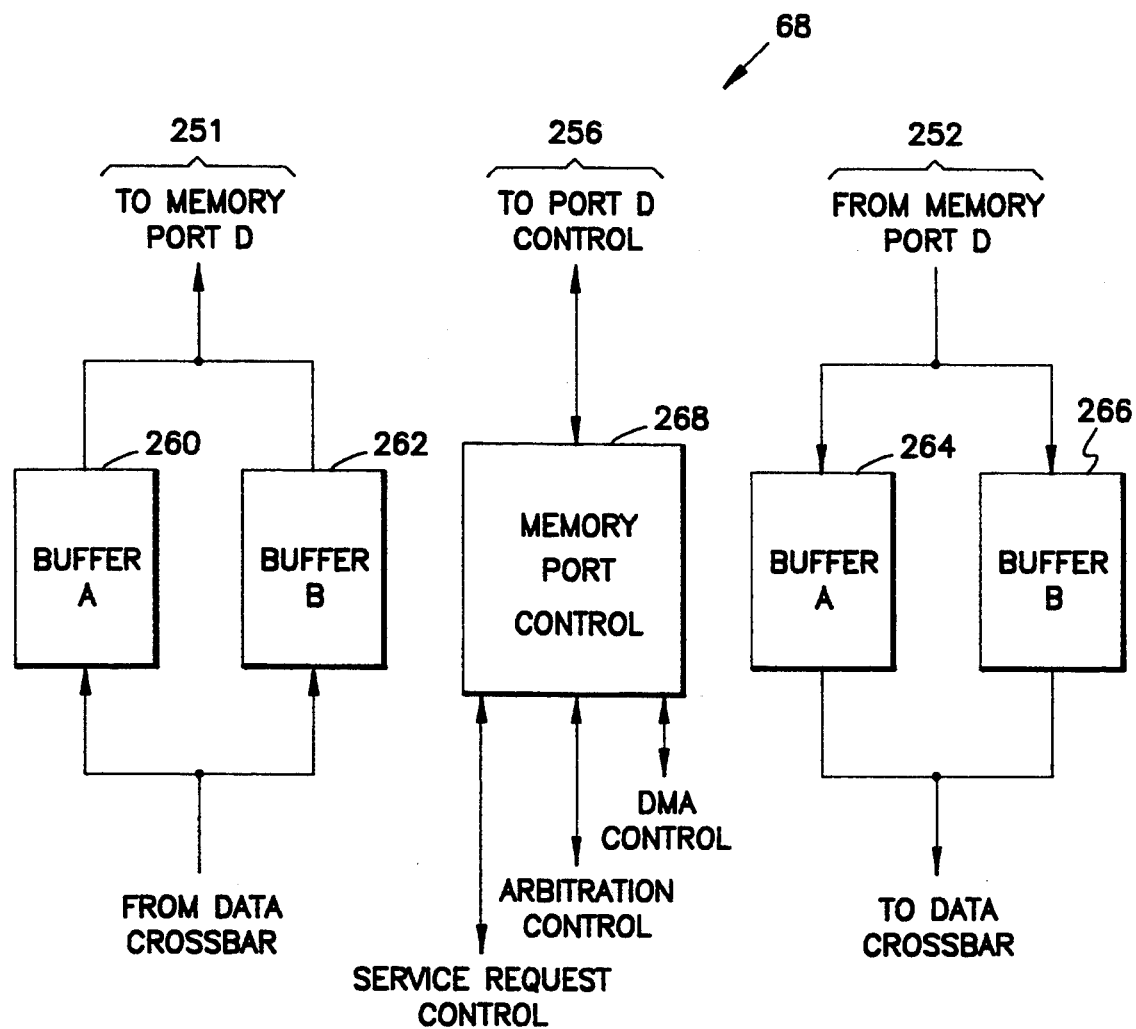
FIG. 6 is a block diagram representing a portion of the data crossbar system.

FIG. 6 shows the input/output memory port 68 of channel arbitrator 30 in greater detail. The port includes a channel 251 from data crossbar 160 to memory port D 80 of CPU 12. The port also includes a channel 252 for transfers in the opposite direction. Each channel 251, 252 has a corresponding pair of buffers 260, 262 and 264, 266, respectively. The memory port also includes a channel 256 for transferring port control information. Memory port control logic unit 268 interacts with CPU port D 80 and various units of the channel arbitrator including the DMA control logic 172, arbitration control logic 170, and service request control 140.

Figure 7:
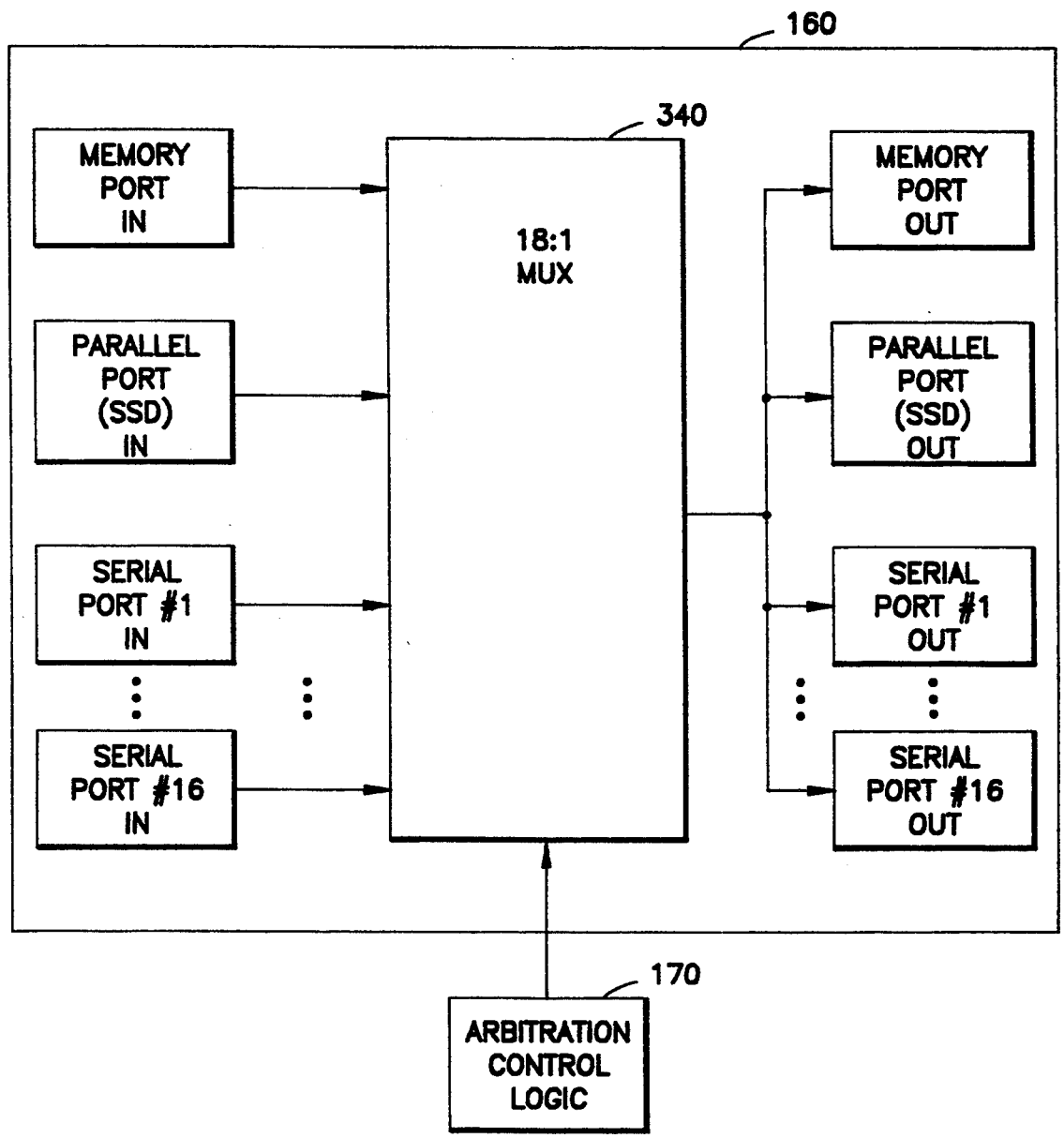
FIG. 7 is a block diagram representing a channel adapter as interconnected with a serial channel and external device.

FIG. 7 shows the data crossbar in more detail, including an 18:1 multiplexer 340. Arbitration control 170 controls the selection of the input to multiplexer 340, since only one datapath and transfer can be active at one time. When the arbitration control logic 170 honors a transfer request, the data crossbar multiplexer 340 is reserved for a time equal to the time required for memory access and transfer of the data through the multiplexer.

Figure 8:
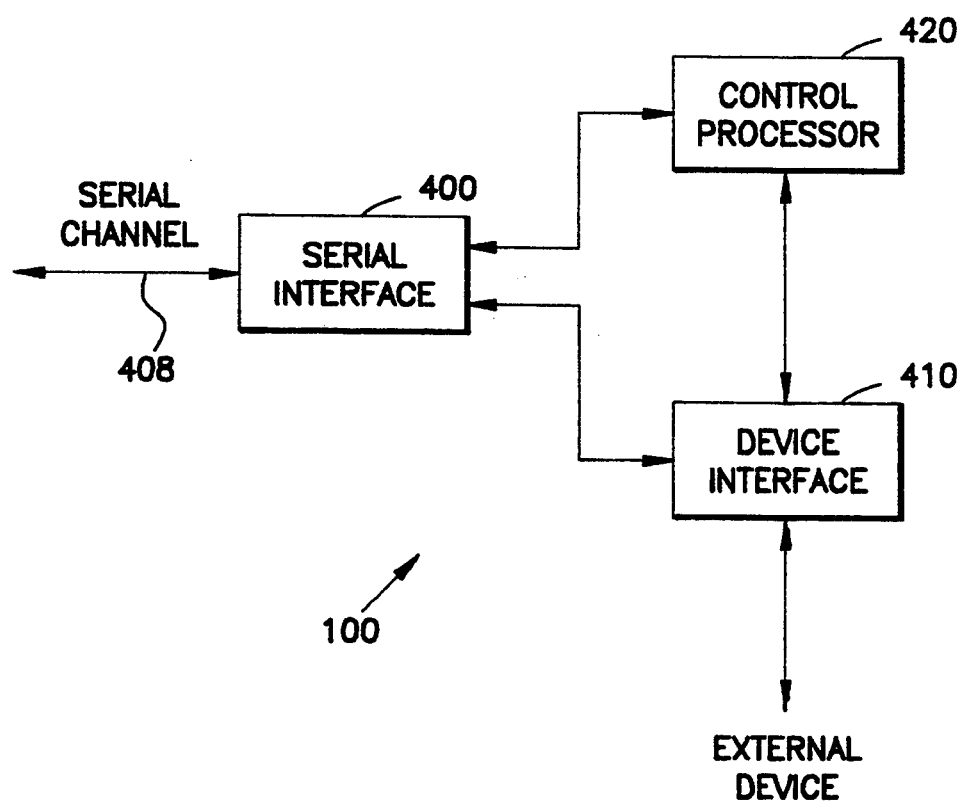
FIG. 8 is a block diagram showing the interconnections between the external devices or peripherals, and other elements of the system through a channel adapter.

An overview of a representative channel adapter 100 is shown in FIG. 8. The adapter has a device-independent serial interface circuit 400 and a device-dependent interface 410.

The serial interface circuit 400 of the channel adapter is identical for each channel adapter. The circuit includes a microprocessor for controlling communications between the channel arbitrator and the channel adapter through serial channel 408 for initiating data transfers and sustaining a common protocol with the CPUs. Serial interface circuit 400 also includes all of the optical/electrical conversion hardware, and the software preferred or required for an intelligent interface to the channel arbitrator associated with the channel adapter.

The device-dependent portion of the channel adapter is represented by device interface circuit 410 in FIG. 8. The hardware in this portion of the channel adapter is customized for the specific peripheral attached to it. The architecture is adaptable for use with any device having a data transfer rate less than or equal to the maximum data transfer rate of the overall multi-processor system, which in the example described in the specification is 1 gigabit. The device interface 410 also includes control circuitry for protocol handshaking between the peripheral device and the channel adapter. Buffering between the external peripheral and the serial channel connected to the associated channel arbitrator is also provided as needed.

The control processor 420 of channel adapter 100 as shown in FIG. 8 is part of the device-independent circuitry along with serial interface 400. The control processor 420 also provides device-dependent firmware for device interface circuit 410.

Figure 9:
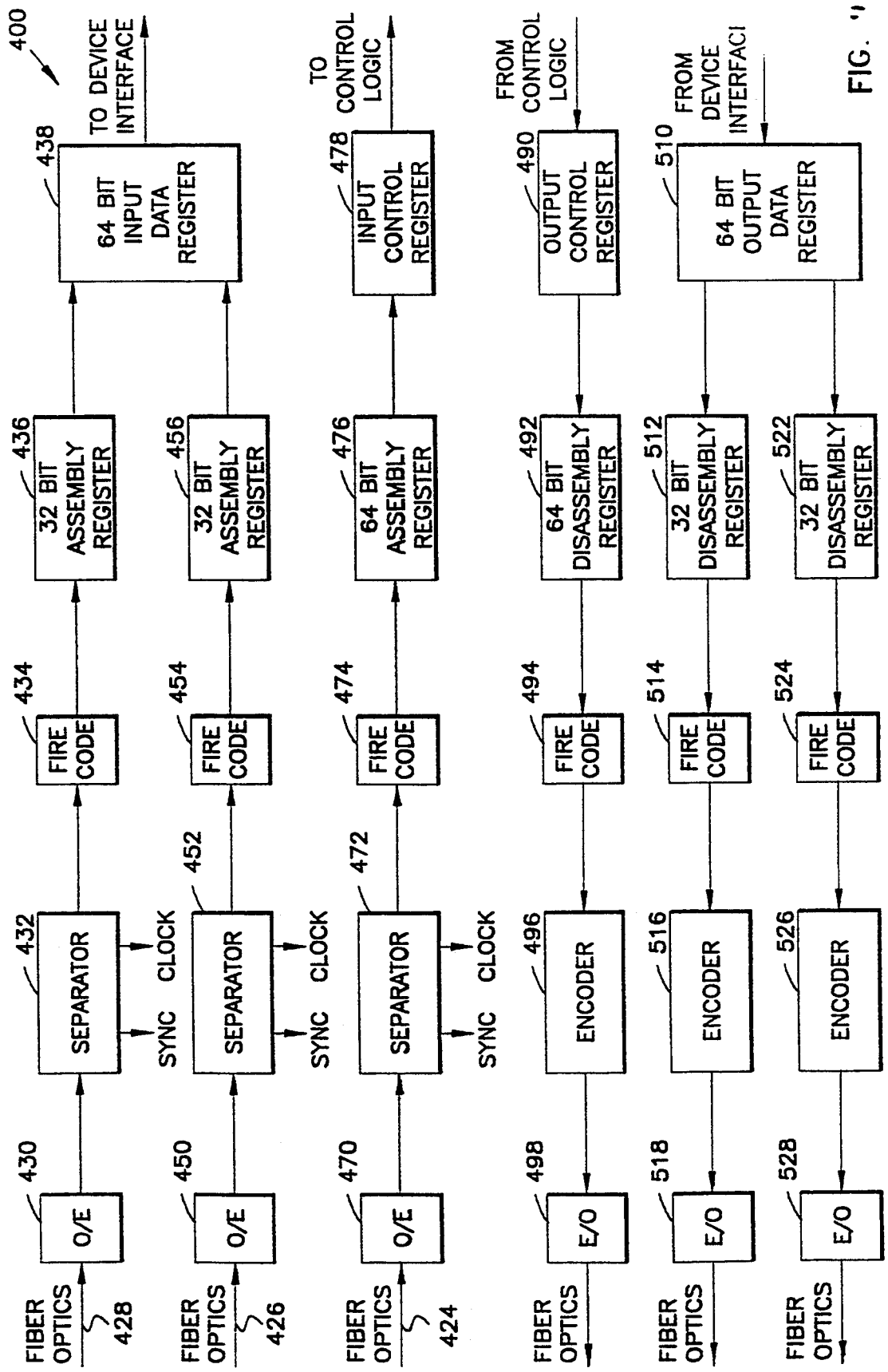
FIG. 9 is a block diagram showing serial interfaces between fiber optic connections, device interfaces, and control logic.

The serial interface 400 is shown in greater detail in FIG. 9. Data and control information is received by the serial interface from the serial channel (408 on FIG. 8) on data optical fibers 428, 426, and control optical fiber 424. The fiber optic signals are then converted by optical/electrical converters 430, 450, 470. The converted signals are provided to separator circuits 432, 452, 472 which separate the signals into data and embedded information such as clock and sync pulses. The separated information is supplied to "fire code" error detection circuits 434, 454, 474. The signals are then supplied to registers 436, 456, 476. Registers 436 and 456 each put the data into 32 bit parallel form for transfer to 64 bit register 438. The data is then in a form suitable for device interface 410. The control signal is received by the serial interface 400 over the fiber optic line 424 and processed in a manner similar to the processing of data except that the electrical signal is supplied to 64 bit assembly register 476 after passing through the "fire code" error detection circuit 474. Information is transferred from register 476 to input control register 478 for transfer to control processor 420.

FIG. 9 also shows the path of signals supplied from control processor 420 and device interface 410 to serial interface 400. The processing is the reverse of the processing as described above and is represented by registers 492, 512, 522, fire code circuits 494, 514, encoders 496, 516, 526 and electrical/optical convertors 498, 518, 528.

Figure 10:
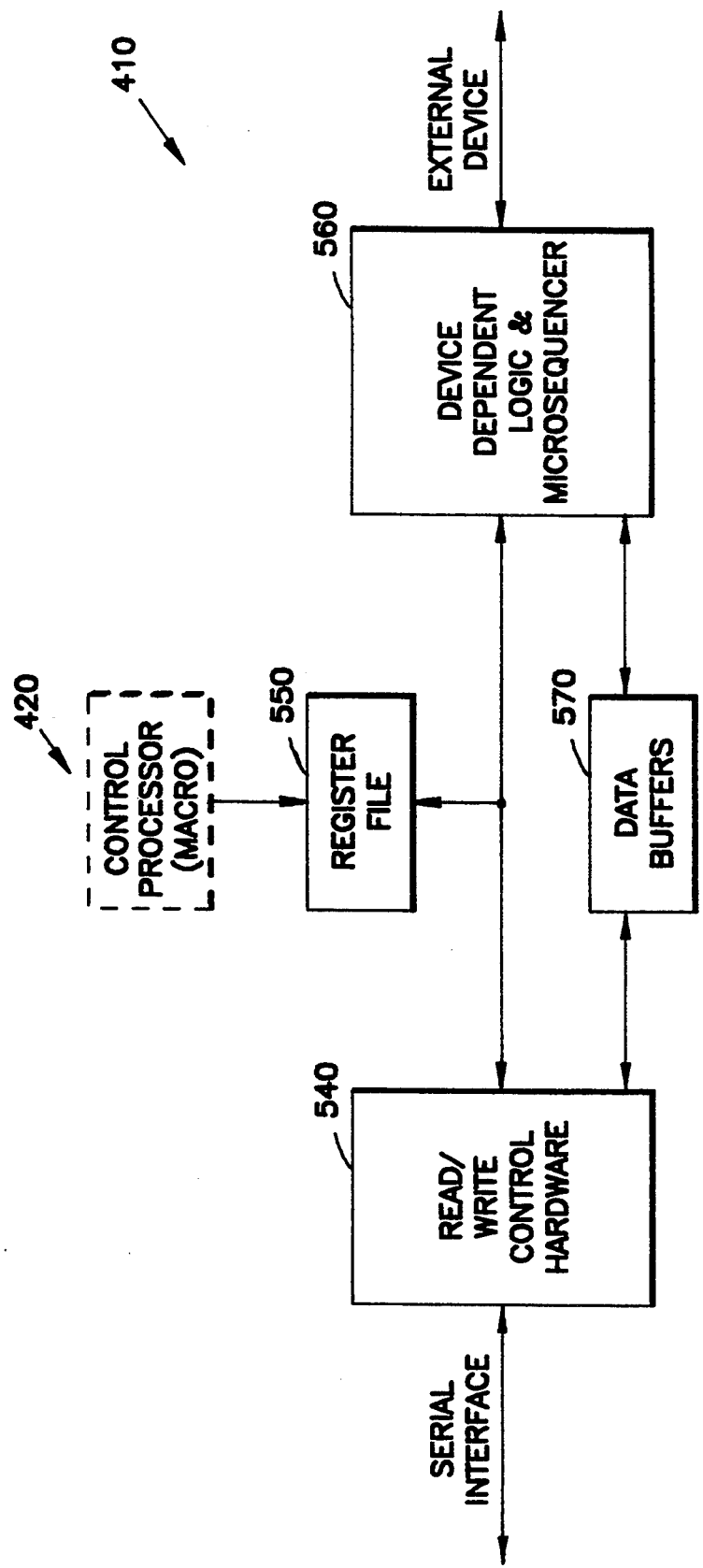
FIG. 10 is a block diagram representing the interconnection system between an external device and a serial interface.

The device interface 410 is shown in greater detail in FIG. 10. Device interfaces such as interface 410 will be developed for particular peripherals, such as high-performance graphics, high-performance disc drives, block MUX tape storage and block MUX disc storage, as well as other high-speed multiprocessor channels. The control processor 420 will supply macro instructions which take the form of a word written into register file 550. These instructions are generated by a microprocessor in control processor 420. Register file 550 is accessible by the microprocessor of control processor 420 as if register 550 was part of the microprocessor's memory space. The register file is dual-ported for equal access by control processor 420 and device interface 410.

The instruction located in file 550 will result in the execution of appropriate high-speed micro instructions by either the device-dependent micro sequencer 560 or the dedicated read/write control hardware 540.

Data buffers 570 will vary according to the specific peripheral, although typically two dual buffers of 64 word blocks will be sufficient for input and output. Data will be transferred between the device-dependent logic 560 and read/write control 540 and not be transferred to control processor 420.

Figure 11:
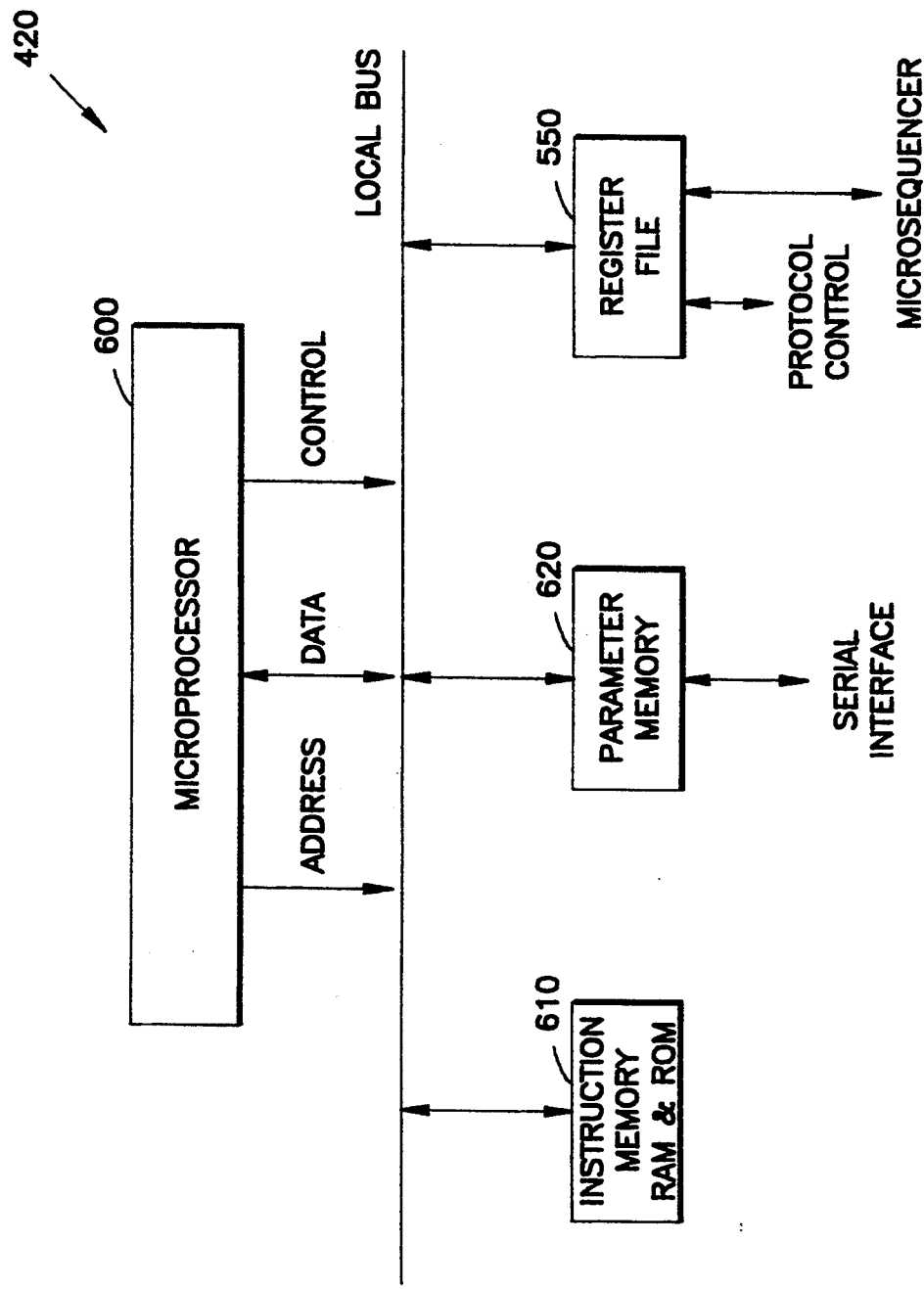
FIG. 11 is a block diagram of a control processor used with an external device interface system.

The control processor 420 is shown in greater detail in FIG. 11. The control includes a high-speed microprocessor 600, RAM/ROM instruction memory 610, parameter memory 620, and register file 550.

The control processor 420 includes microcode for controlling both the device-independent and device-dependent circuitry. The device-independent microcode will be standard for each control processor in each channel adapter and include instructions for responding to service requests and parameter packets, dealing with channel protocol, and reporting status. The device-dependent micro code will have instructions for communicating with and controlling peripheral devices. This code will reside in the local memory of microprocessor 600 and will be downloaded at initialization. ROM memory 610 will store boot routines and self-check diagnostics. Parameter package values are sorted in parameter memory 620, which is large enough to store both the current and next parameter packet tables. Parameter memory 620 is dually coded for access by microprocessor 600 and serial interface 400.

Register file 550 receives macro commands from microprocessor 600 which are supplied to the device interface 410. Macro commands are used in recognition of the higher speed of peripheral control signals as opposed to the response rate of the microprocessor.

Formatting of bits transferred over the control fibers will now be described. The format includes a control packet of 64 control bits preceded by a sync bit. The format of such a control packet is shown in Table 1. Three bits of the control packet format for the arbitrator to the serial channel adapter are generated at the channel adapter: the Read Sync Error, the Read CRC Error 0, and the Read CRC Error 1. The definitions of the control packet bits for the packet shown on Table 1 are described below:

TABLE 1

Control Packet Format (I/O Arbitrator to SCA)

| P - 0 Control Mask (See Below) | P - 1 Serial Ch Branch # $2^3 - 2^0$ | P - 2 Addr $2^{35} - 2^{32}$ | $2^{31} - 2^{16}$ | P - 3 $2^{15} - 2^0$ |
|---|---|---|---|---|
| $2^0$ — 000001 = | Transmit Enable | | | |
| $2^1$ — 000002 = | Memory Write SECDED Error | | | |
| $2^2$ — 000004 = | Write Sync Error (on data 0, 1, or control) | | | |
| $2^3$ — 000010 = | Write CRC Error 0 | | | |
| $2^4$ — 000020 = | Write CRC Error 1 | | | |
| $2^5$ — 000040 = | (N/U) | | | |
| $2^6$ — 000100 = | Memory Read SECDED Error | | | |
| $2^7$ — 000200 = | SSD Memory Write SECDED Error | | | |
| $2^8$ — 000400 = | SSD Memory Read SECDED Error | | | |
| $2^9$ — 001000 = | Sequence Error | | | |
| $2^{10}$ — 002000 = | Read Sync Error | | | |
| $2^{11}$ — 004000 = | Read CRC Error 0 | | | |
| $2^{12}$ — 010000 = | Reset | | | |
| $2^{13}$ — 020000 = | Read CRC Error 1 | | | |
| $2^{14}$ — 040000 = | (N/U) | | | |
| $2^{15}$ — 100000 = | Go Read Parameter | | | |

$2^0$ Transmit Enable

Control bit informing the channel adapter that there is sufficient room in the arbitrator serial buffer to receive at least 64 words.

$2^1$ Memory Write SECDED Error

A control bit informing the channel adapter that an uncorrectable data error occurred on the date going through the arbitrator towards memory.

$2^2$ Write Sync Error (on data 0, 1, or control)

Control bit informing the channel adapter that a sync error occurred on one of the optical fiber lines from the channel adapter. (Sync error indicates a control or data packet was received that had more than 64 bits or less than 64 bits.)

$2^3$ Write CRC Error 0

Control bit informing the channel adapter that a CRC error occurred on datapath 0 from the channel adapter.

$2^4$ Write CRC Error 1

(Same as CRC Error 0 except associated with the datapath 1.)

$2^5$ (N/U)

$2^6$ Memory Read SECDED Error

Control bit informing the channel adapter that an uncorrectable data error occurred on the data read from memory through arbitrator to the channel adapter.

$2^7$ SSD Memory Write SECDED Error (See bit $2^1$—similar but associated with SSD.)

$2^8$ SSD Memory Read SECDED Error (See bit $2^6$—similar bit associated with SSD.)

$2^9$ Sequence Error

Control bit informing the channel adapter that a sequence error has occurred on the arbitrator. (For example: Read and write requested at the same time, buffer overrun, etc.)

$2^{10}$ Read Sync Error—control bit generated on the serial channel adapter indicating a Read Sync Error has occurred on the data or control $2^{11}$ Read CRC Error 0—control bit generated on the serial channel adapter indicating a Read CRC Error has occurred on Data Path 0

$2^{12}$ Reset

Control bit forcing the channel adapter to clear out and restart.

$2^{13}$ Interrupt

Control bit forcing the channel adapter to wake up and recover. (Note: Interrupt is performed first to awaken the channel adapter. If this fails then a reset is performed.)

$2^{14}$ Read CRC Error 1—control bit generated on the serial channel adapter indicating a Read CRC Error has occurred on Data Path 1

$2^{15}$ Go Read Parameter

Control bit informing the channel adapter which will initiate a parameter read sequence.

Serial Channel Branch #

SCB# is an address which points at one of the devices on channel adapter. The control mask bits that use the SCB# are:

$2^{12}$ Reset
$2^{13}$ Interrupt
$2^{15}$ Go Read Parameters

Address $2^{35}$–$2^0$

The address bits are used by the go read parameters control mask bit ($2^{15}$).

The control packet format for transfers from the adapter to the arbitrator are described in Table 2. The definitions of the bits for the Table 2 control packet are as follows:

TABLE 2

Control Packet Format (SCA to I/O Arbitrator)

| P - 0 Control Mask (See Below) | P - 1 Partial Block $2^5$ - $2^0$ | P - 2 Addr $2^{35}$ - $2^{32}$ | $2^{31}$ — $2^{16}$ | P - 3 $2^{15}$ — $2^0$ |
|---|---|---|---|---|
| $2^0$ — 000001 = | Memory Read Request | | | |
| $2^1$ — 000002 = | Memory Write Request | | | |
| $2^2$ — 000004 = | (N/U) | | | |
| $2^3$ — 000010 = | SSD Read Request | | | |
| $2^4$ — 000020 = | (N/U) | | | |
| $2^5$ — 000040 = | (N/U) | | | |
| $2^6$ — 000100 = | CPU Master Clear | | | |
| $2^7$ — 000200 = | CPU Dead Start | | | |
| $2^8$ — 000400 = | System Master Clear | | | |
| $2^9$ — 001000 = | Interrupt | | | |
| $2^{10}$ — 002000 = | SSD Master Clear | | | |
| $2^{11}$ — 004000 = | Serial Channel Clear | | | |
| $2^{12}$ — 010000 = | (N/U) | | | |
| $2^{13}$ — 020000 = | (N/U) | | | |
| $2^{14}$ — 040000 = | (N/U) | | | |
| $2^{15}$ — 100000 = | (N/U) | | | |

$2^0$ Memory Read Request

Control bits requesting the arbitrator to do an memory block read. (Block size is indicated by the partial block length $2^5$–$2^0$; B.L. of 0 is a 64 word transfer.)

$2^1$ Memory Write Request

Control bit requesting the arbitrator to do an memory block write.

$2^2$ (N/U)

$2^3$ SSD Read Request

Control bit requesting the arbitrator to do an SSD 64 word read.

$2^3$ SSD Write Request

Control bit requesting the arbitrator to do an SSD 64 word write.

$2^5$ (N/U)

$2^6$ CPU Master Clear

Control bit used to master clear an CPU.

$2^7$ CPU Dead Start

Control bit used to dead start an CPU.

$2^8$ System Master Clear

Control bit used to master clear the entire system.

$2^9$ Interrupt

Control bit used to master clear the SSD.

$2^{11}$ SCA Clear

Control bit used to clear the serial channel logic on the I/O A.

$2^{13}$–$2^{15}$ (N/U)

Partial Blocklength $2^5$–$2^0$

Bits indicating the number of words to be read or written from/to the memory (A Block Length of 0 indicates a 64 word x for).

Address $2^{35}$–$2^0$

Memory address or SSD address used for read/write references.

The software components of the input/output system consist of user software libraries which manage the access methods as well as privilege subsystem software for handling label, error and other processing all executed from the CPU. I/O kernel software also executed from the operating system on the CPU manages I/O request queuing and completion. Finally, the software includes local I/O processor software, which runs in a channel adapter. Device-independent code processes I/O requests and device-dependent code controls peripherals.

The user software includes a "cooked" access method and a "raw" access method. The cooked method uses a fixed block size dependent on the peripheral being accessed. The raw access method may have variable box sizes and is used for structured files. The privileged subsystem software (Daemon) controls label processing, error threshholding, resource scheduling, and global error recovery.

The I/O kernel is used when the user issues an I/O request. The kernel builds a parameter packet that contains all of the information necessary to describe the I/O request.

The I/O processor software is responsible for initialization of the I/O processor, processing parameter packets located in the channel queue for the I/O host. The I/O processor processes one parameter packet request while reading another parameter packet to minimize delay time. The I/O software also includes peripheral-dependent software for controlling peripheral devices incapable of handling both raw and cooked access methods. This software interacts with device-dependent firmware in the channel adapter described previously.

At system boot time, the channel adapter firmware for the control processor is initially loaded. The control processor has sufficient ROM storage to load from either its RS232 port or from the main frame computer. The channel adapter assumes a "master" role in controlling serial data transfers.

Any of the CPUs within a CPU cluster may make a request for I/O service from any arbitrator. FIG. 3 shows service request port 140 of channel arbitrator 30 interconnected to each CPU in the CPU cluster. Arbitrator 30 transfers the request to the appropriate channel adapter. The channel adapter responds to the request by reading the appropriate parameter packet for the request. The parameter packet is stored in dedicated parameter memory and is interpreted by the control processor of the channel adapter, which executes the device-dependent firmware and communicates with the device interface by reading and writing words into and out of a register file. As data accumulates in data buffers, hardware in the device interface signals the serial interface to transfer the data across the serial channel.

The control processor reads the current parameter packet to determine the main memory access of the parameter packet in its work queue once the processing of the prior parameter packet and service request nears completion. The parameter packet is fetched from main memory and queued by the control processor to avoid delays in data transfer rates with high-speed peripherals. In this manner, as soon as the prior parameter packet has been completely processed, the channel adapter may immediately address the next service request. When a parameter packet has been processed, the channel adapter will return the updated parameter packet to the appropriate location. Interrupt flags are set as appropriate.

There is one parameter packet queue per channel. Each parameter packet has a memory reference that allows the I/O processor to pick up the next parameter packet. The use of a parameter packet queue minimizes losses in the case of an I/O processor failure, since the I/O kernel always knows which parameter packets have been issued and completed. The request can be redirected if a particular I/O processor is unable to process the parameter packet.

DMA transfers involve moving large blocks of data under hardware control from main memory to or from solid state memory. A short three-word parameter packet is established in main memory which includes the main memory start address for the block of data, a solid state memory start address for the block of data, the number of blocks to be transferred, and the direction of transfer. Once the informational parameter packet is set up, the CPU issues a DMA transfer request to the appropriate arbitrator. The arbitrator directs the DMA request to the DMA control logic, which reads the parameter packet and initiates the transfer. The DMA control logic (172 in arbitrator 30 in FIG. 3) calculates main memory and solid state memory addresses for each 64-word block to be transferred. The DMA logic generates all signals required to interface with the arbitration control logic and the solid state memory port. The DMA control logic sets on the I/O interrupt flag in the parent CPU once transfer of the final block of the transfer request is completed.

DMA requests occur only between main memory and solid state memory and involve fixed length, 64-word data blocks. Because of their low priority, DMA requests are queued on 64 clock period intervals for maximum use of the memory port band width.

The channel arbitrator will service DMA transfer requests once all pending serial channel requests have been serviced. Once one DMA request has cleared in a time equal to 64 clock periods plus memory conflict resolution time, the next DMA request is honored if there are no serial channel requests pending. If serial channel requests are pending, they take priority and will be honored next. If there are no serial channel requests pending, up to four DMA requests may be in various stages of service at any one time. If a serial channel raises a request, all active DMA requests are completed prior to servicing the serial channel requests.

Use of an I/O system in accordance with the above description results in the use of distributed control logic in a compact form. The combination of standardization and customization which increases efficiency with particular peripherals, is achieved by the use of channel adapters having both device-dependent and device-independent circuitry. The use of standardized circuitry where possible in the system allows the use of standard processors. The above system is adapted for allowing transfers of large data blocks at high rates when the arbitrator has cleared serial transfer requests and is ready to perform such large block transfers. Each channel arbitrator is capable of deciding priority between serial and DMA transfer requests, further distributing the control logic.

The use of parameter packets to package large data blocks is efficient in that the packets are standardized, the control logic is distributed, and subsequent data blocks are quickly obtained through the inclusion of the next parameter packet address as part of the prior packet information block. The use of such parameter packets allows the operating system to access the large blocks when higher priority requests have been fulfilled in an efficient manner. Other advantages of the above input/output system will also be evident to those skilled in the art.

CONCLUSION

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is manifestly intended that this invention be limited only by the claims and the equivalents thereof.

What is claimed is:

1. An input/output system for a supercomputer, comprising:
   (a) a CPU;
   (b) a main memory having a plurality of directly addressable memory locations connected to said CPU;
   (c) a solid state memory;
   (d) a plurality of channel adapter means for interfacing between a standard input/output protocol and a non-standard input/output protocol of a particular peripheral device; and
   (e) an input/output channel arbitrator connected to said CPU, said main memory, said solid state memory and said plurality of channel adapter means, such that said input/output channel arbitrator facilitates input/output data transfers between said peripherals, said main memory, said CPU and said solid state memories in response to requests received from said CPU.

2. A system according to claim 1 wherein said input/output channel arbitrator includes a datapath crossbar network which receives data from any of a plurality of CPUs, of which said CPU is a member, said main memory, said solid state memory, or said plurality of channel adapter means, and is capable of transferring said data to any one of said plurality of CPUs, main memory, solid state memory or plurality of channel adapter means.

3. A system according to claim 2 wherein said input/output channel arbitrator further includes arbitration control logic operable for receiving transfer requests and servicing said requests by arranging a datapath through said datapath crossbar network to effect the requested transfer.

4. A system according to claim 1 further including a plurality of CPUs, of which said CPU is a member, connected to said input/output channel arbitrator such that the input/output channel arbitrator connected to said plurality of CPUs facilitates input/output transfers for said plurality of CPUs.

5. An input/output system for a computer comprising:
   (a) a plurality of central processing unit clusters, each cluster comprised of a plurality of central processing units;
   (b) a plurality of solid state memories, each said solid state memory associated with one of said central processing unit clusters;
   (c) a set of main memories, each said main memory associated with one of said central processing unit clusters;
   (d) a plurality of input/output channel arbitrator processor means for controlling flow of data among the central processing units, the solid state memory, and main memory, each said channel arbitrator processor means associated with one of the central processing units and electrically interconnected thereto;
   (e) a plurality of channel adapter processor means, each said channel adapter processor means under software control from, associated with and electrically connected to one of said plurality of input/output channel arbitrator processor means, each said channel adapter processor means having:
      peripheral-independent circuitry which is generally similar to peripheral-independent circuitry in each other of said channel adapter processor means for controlling the transfer of, and transferring, data between
         (1) each said channel adapter processor means and
         (2) the central processing unit associated with each said channel arbitrator processor means associated with each of said channel adapter processing means; and
      peripheral-dependent circuitry adapted for controlling the transfer of and transferring data between
         (3) a peripheral associated with each channel adapter processor means and
         (4) each channel adapter processor means;
   (f) a plurality of first serial channel interconnection means, each of which is associated with one of said channel arbitrator processor means and one of said channel adapter processor means, for serial transfer of data between the associated channel arbitrator processor means and the associated channel adapter processor means; and
   (g) parallel interconnection means for high speed data transfer between solid state memory associated with a particular central processing unit cluster and a main memory associated with the same central processing unit cluster.

6. A system in accordance with claim 5 wherein each of said plurality of input/output channel arbitrator processor means is electrically interconnected with a memory port in the central processing unit associated with the input/output channel arbitrator processor means, for accessing said main memory associated with said central processing unit.

7. A system in accordance with claim 5 wherein each of said plurality of input/output channel arbitrator processor means comprises direct memory access control logic for controlling block transfers of data between the main memory associated with said central processing unit cluster and the solid state memory associated with said central processing unit cluster.

8. A system in accordance with claim 7 wherein each of said plurality of input/output channel arbitrator processor means further comprises arbitration control logic for controlling data transfers involving one of said plurality of channel adapter processor means, and the main memory or solid state memory associated with the central processing unit cluster.

9. A system in accordance with claim 8 wherein each of said plurality of input/output channel arbitrator processor means further comprises serial channel control logic for receiving access requests from the channel adapter processor means associated with said input/output channel arbitrator processor means and processing the received access request to transfer data in accordance with the received access requests.

10. A system in accordance with claim 9 wherein said channel arbitrator processor means further comprises means for receiving service requests from each central processing unit within a central processing unit cluster and means for processing the received service requests to transfer data in accordance with the received service requests.

11. A system in accordance with claim 10 wherein said plurality of input/output channel arbitrator processor means further comprises means for receiving and storing multiple direct memory access service requests while serial channel transfer requests such that said direct memory access requests are serviced after said serial channel transfer requests have been serviced.

12. A system in accordance with claim 11 wherein the direct memory access service requests comprise parameter packets including main memory start address information, solid state memory start address information, information indicative of the number of fixed-length data blocks to be transferred, and information indicating the direction of transfer.

13. A system in accordance with claim 9 wherein each of said plurality of input/output channel arbitrator processor means further comprises a data crossbar under the control of the arbitration control logic and the serial channel control logic for transferring data among said serial channels, said main memory, and said solid state memory.

14. A system in accordance with claim 5 wherein each of said channel adapter processor means comprises:
   (a) a control processor for generating macro instructions for controlling the transfer of data between a peripheral associated with said channel adapter processor means and a serial channel interconnection means associated with said channel adapter processor means;
   (b) a register file accessible by said control processor for storing the macro instructions generated by said control processor;
   (c) a logic and micro sequencer circuit electrically interconnected to said register file responsive to macro instructions stored in said register file for controlling the transfer of data from and to the peripheral associated with the channel adapter processor means; and
   (d) read/write control circuitry electrically interconnected to said register file responsive to the macro instructions stored in said register file for controlling the transfer of data from and to said serial channel interconnection means.

15. A system in accordance with claim 14 wherein said control processor comprises means for storing device-independent micro code and device-dependent micro code.

16. A method for transferring data from a peripheral to main memory in a supercomputer system, comprising the steps of:
   (a) generating a transfer request;
   (b) forwarding the transfer request to an appropriate channel adapter;
   (c) reading the transfer request in the channel adapter;
   (d) interpreting the transfer request and generating in response thereto peripheral-dependent control information;
   (e) transferring the peripheral-dependent control information to a peripheral device;
   (f) transferring the requested data from the peripheral device to the channel adapter;
   (g) configuring a datapath crossbar to enable a path for data to be transferred from the channel adapter to a CPU;
   (h) transferring the requested data from the channel adapter through the datapath crossbar to the CPU; and
   (i) forwarding the data to a memory.

* * * * *

UNITED STATES PATENT AND TRADEMARK OFFICE
CERTIFICATE OF CORRECTION

PATENT NO. : 5,388,217

DATED : Feb. 7, 1995

INVENTOR(S) : Gary E. Benzschawel et al.

It is certified that error appears in the above-identified patent and that said Letters Patent is hereby corrected as shown below:

In column 10, line 50, please delete --$2^{13}$-- and insert "$2^{12}$" therefor.
Title page, item [56],
Under References Cited, U.S. Patent Documents, please insert "3,319,230, 5/1967, Astrahan et al."

Under References Cited, U.S. Patent Documents, please insert "3,336,582, 8/1967, Beausoleil et al."

Under References Cited, U.S. Patent Documents, please insert "3,427,592, 2/1969, Bahnsen et al."

Under References Cited, U.S. Patent Documents, please insert "3,564,502, 2/1971, Boehner et al."

Under References Cited, U.S. Patent Documents, please insert "3,582,906 , 6/1971, Beausoleil et al."

Under References Cited, U.S. Patent Documents, please insert "3,623,155, 11/1971, Hsiao et al."

Under References Cited, U.S. Patent Documents, please insert "3,688,274, 8/1972, Cormier et al."

Under References Cited, U.S. Patent Documents, please insert "3,812,473, 5/1974, Tucker"

UNITED STATES PATENT AND TRADEMARK OFFICE
CERTIFICATE OF CORRECTION

PATENT NO. : 5,388,217

DATED : Feb. 7 1995

INVENTOR(S) : Gary E. Benzschawel et al.

It is certified that error appears in the above-identified patent and that said Letters Patent is hereby corrected as shown below:

Under References Cited, U.S. Patent Documents, please insert "3,812,475, 5/1974, Christiansen et al."

Under References Cited, U.S. Patent Documents, please insert "3,836,891, 9/1974, McDaniel"

Under References Cited, U.S. Patent Documents, please insert "3,842,405, 10/1974, Key et al."

Under References Cited, U.S. Patent Documents, please insert "3,976,977, 8/1976, Porter et. al"

Under References Cited, U.S. Patent Documents, please insert "4,006,466, 2/1977, Patterson et al."

Under References Cited, U.S. Patent Documents, please insert "4,038,642, 7/1977, Bouknecht et al."

Under References Cited, U.S. Patent Documents, please insert "4,074,352, 2/1978, Cook et al."

Under References Cited, U.S. Patent Documents, please insert "4,106,092 ,8/1978, Millers, II et al."

Under References Cited, U.S. Patent Documents, please insert "4,125,870, 11/1978, Suzuki et al."

Under References Cited, U.S. Patent Documents, please insert "4,162,520, 7/1979 ,Cook et al."

UNITED STATES PATENT AND TRADEMARK OFFICE
CERTIFICATE OF CORRECTION

PATENT NO. : 5,388,217

DATED : Feb. 7 1995

INVENTOR(S) : Gary E. Benzschawel et al.

It is certified that error appears in the above-identified patent and that said Letters Patent is hereby corrected as shown below:

Under References Cited, U.S. Patent Documents, please insert "4,228,496, 10/1980, Katzman et al."

Under References Cited, U.S. Patent Documents, please insert "4,309,755, 1/1982, Lanty"

Under References Cited, U.S. Patent Documents, please insert "4,378,588, 3/1983, Katzman et al."

Under References Cited, U.S. Patent Documents, please insert "4,385,382, 5/1983, Goss et al."

Under References Cited, U.S. Patent Documents, please insert "4,454,575, 6/1984, Bushaw et al."

Under References Cited, U.S. Patent Documents, please insert "4,455,621, 6/1984 Pelley et al."

Under References Cited, U.S. Patent Documents, please insert "4,455,661, 6/1984, Qureshi"

Under References Cited, U.S. Patent Documents, please insert "4,484,275, 11/1984, Katzman et al."

Under References Cited, U.S. Patent Documents, please insert "4,542,457, 9.1985, Mortensen et al."

Under References Cited, U.S. Patent Documents, please insert "4,571,674, 2/1986, Hartung"

UNITED STATES PATENT AND TRADEMARK OFFICE
CERTIFICATE OF CORRECTION

PATENT NO. : 5,388,217　　　　　　　　　　　　　　　　Page 4 of 5

DATED : Feb. 7 1995

INVENTOR(S) : Gary E. Benzschawel et al.

It is certified that error appears in the above-identified patent and that said Letters Patent is hereby corrected as shown below:

Under References Cited, U.S. Patent Documents, please insert "4,602,331, 7/1986, Sheth"

Under References Cited, U.S. Patent Documents, please insert "4,628,446 ,12/1986, Hoffner, II"

Under References Cited, U.S. Patent Documents, please insert "4,630,230, 12/1986, Sundet"

Under References Cited, U.S. Patent Documents, please insert "4,788,638, 11/1988 ,Ogawa et al."

Under References Cited, U.S. Patent Documents, please insert "4,819,232, 04/1989, Krings"

Under References Cited, U.S. Patent Documents, please insert "4,852,045, 7/1989, Kraul et al."

Under References Cited, U.S. Patent Documents, please insert "4,878,173, 10/1989, Goekjian"

Under References Cited, U.S. Patent Documents, please insert "4,901,230, 2/1990, Chen et al."

Under References Cited, U.S. Patent Documents, please insert "4,939,644, 7/1990, Harrington et al."

Under References Cited, U.S. Patent Documents, please insert "5,062,043, 10/1991, Asakawa et al."

UNITED STATES PATENT AND TRADEMARK OFFICE
CERTIFICATE OF CORRECTION

PATENT NO. : 5,388,217

DATED : Feb. 7 1995

INVENTOR(S) : Gary E. Benzschawel et al.

It is certified that error appears in the above-identified patent and that said Letters Patent is hereby corrected as shown below:

Under References Cited, U.S. Patent Documents, please insert "5,072,420, 12/1991, Conley et al."

Under References Cited, Foreign Patent Documents, please insert "1,191,560, 5/1970, United Kingdom"

Signed and Sealed this

Twenty-third Day of September, 1997

Attest:

BRUCE LEHMAN

*Attesting Officer*       Commissioner of Patents and Trademarks